Patented Dec. 29, 1942

2,306,635

UNITED STATES PATENT OFFICE 2,306,635

METHOD FOR THE PREPARATION OF STEROIDAL CARBINOLS

Russell Earl Marker, State College, Pa., assignor to Parke, Davis & Company, Detroit, Mich., a corporation of Michigan No Drawing. Application August 3, 1940, Serial No. 351,149

9 Claims. (Cl. 260—397.1)

This invention relates to steroidal carbinols and methods for the preparation of the same.

Accordingly, an object of this invention is the preparation of steroidal carbinols useful for the preparation of hormones.

Another object of this invention is to afford new and useful methods for preparing steroidal carbinols from the corresponding steroidal ketones.

A further object of this invention is to afford methods for the preparation of 3-hydroxy steroids from steroids having a ketone group at $C_3$ as well as possibly at other positions in the steroid molecule.

Other objects of this invention will be apparent on perusal of this specification and the appended claims.

By the term steroidal ketone as used in this specification I refer to 10,13-dimethyl-cyclopentano-polyhydro-phenanthrene derivatives having ketone groups in the nucleus and/or in the side chain attached to carbon atom 17. Ketone groups in the nucleus may be at positions 1, 2, 3, 4, 6, 7, 11, 12, 15, 16 or 17.

It is known that such steroidal ketones may be reduced by the Wolf-Kishner method, using for example the reaction of sodium ethylate on the semicarbazone of the steroidal ketone, to reduce the steroidal ketone to the corresponding compound in which the carbonyl group has been replaced by a methylene group. Thus for example it is known that 3-($\alpha$)-hydroxy-12-keto-cholanic acid semicarbazone may be heated with sodium ethylate for about ten hours at about 180° C. to obtain 3-($\alpha$)-hydroxy-cholanic acid (lithocholic acid).

Accordingly, it would be anticipated that all steroidal ketones would behave in a similar fashion. However, I have found that steroidal ketones having a nuclear 3-keto grouping behave anomalously in that they are reduced only to an intermediate stage, to give mainly the corresponding 3-hydroxy compounds, although ketone groups at other positions in the steroidal skeleton are reduced to methylene groups.

In practicing my invention I treat a steroidal ketone having a ketone group at least at $C_3$ with a member of the class consisting of hydrazine and its monoacylated derivatives; thereby forming a hydrazone or an acyl-substituted hydrazone of the steroidal ketone. This hydrazone or substituted hydrazone of the steroidal ketone is then treated at an elevated temperature, as for example 150°–250° C., with an alcohol and an alkali metal hydroxide, amide, or alcoholate.

My invention may be further illustrated by the following examples:

Example 1

(a) Pregnanol-20-($\alpha$)-one-3-acetate is prepared as described, for example, by Marker et al., J. Am. Chem. Soc. 59, 2291 (1937).

A mixture of 1.1 g. of pregnanol-20-($\alpha$)-one-3-acetate, 0.6 g. of semicarbazide hydrochloride, 0.9 g. of sodium acetate, and 20 cc. of alcohol is refluxed for three hours and then the mixture is diluted with water. After standing overnight in the refrigerator the precipitate is collected and washed with water to give about 1.34 g. of crude semicarbazone of melting point 200–204° C. with decomposition.

(b) Without further purification, this semicarbazone (1.34 g.) is heated for seven hours at 180° C. with a solution of 1 g. of sodium in 12 cc. of absolute alcohol. The reaction mixture is washed out of the bomb tube with ether and water and the insoluble crystalline material collected and washed with ether to obtain the crude reaction product, melting point 230°. After recrystallization from alcohol-acetone this product, pregnanediol-3-($\alpha$)-20-($\alpha$) melts at 240° and does not depress with an authentic sample. The ethereal washings and the alcohol-acetone mother liquor may be concentrated to yield a further quantity of pregnanediol-3-($\alpha$)-20-($\alpha$), to bring the total yield up to 85%.

To show further the identity of this product it may be converted into its acetate by refluxing with acetic anhydride. The acetic anhydride is removed in vacuo and the crystalline residue recrystallized from methanol to give pregnanediol-3-($\alpha$)-20-($\alpha$) diacetate of melting point 180° C.

Example 2

(a) The disemicarbazone of pregnanedione is prepared by refluxing approximately equal amounts of pregnanedione, semicarbazide hydrochloride, and potassium acetate in about fifty times as much alcohol for about three hours. The mixture is diluted with water and the precipitate collected and washed with ether. This crude disemicarbazone may be purified by washing with hot alcohol, but it is sufficiently pure for most purposes without recrystallization.

(b) To a solution of 1 g. of sodium dissolved in 10 cc. of absolute alcohol is added 1 g. of pregnanedione disemicarbazone. The bomb tube is sealed and heated at 170–200° for six to twelve hours. At the end of this time, the tube is opened and the contents diluted with water and ether.

The ethereal layer is separated, washed with water and evaporated to leave a crystalline residue. This is recrystallized from slightly diluted alcohol and then from methanol to give pure pregnanol-3-($\alpha$) of melting point 148°, in the form of needle-rosettes.

This product may be converted into its acetate by refluxing with acetic anhydride for about twenty minutes. After removal of the acetic anhydride the residue is crystallized from methanol to give the acetate of pregnanol-3-($\alpha$) of melting point 106° C.

Example 3

Cholestanedione-3,6 is prepared in the usual manner, as for example by oxidation of cholesterol with chromic anhydride in acetic acid to form $\Delta^4$-cholestenedione-3,6; and reducing this with zinc and acetic acid to give cholestanedione-3,6.

The disemicarbazone of cholestanedione-3,6 is prepared by heating a mixture of 5 g. of cholestanedione-3,6 with 4 g. of semicarbazide hydrochloride and 5 g. of sodium acetate in 300 cc. of alcohol for two hours. At the end of this time the mixture is poured into water and the precipitate collected. The precipitate is washed with ether and the residue thus obtained is crystallized once from alcohol.

(b) To a solution of 5 g. of sodium in 50 cc. of alcohol is added 5 g. of the above disemicarbazone of cholestanedione-3,6. The mixture is heated in a small autoclave at 180° for ten hours. Then it is cooled, the pressure released, and the contents of the autoclave diluted with water and extracted with ether. The ethereal layer is washed well with water and then the ether is removed on the steam bath. The residue is crystallized from methanol to give mainly $\beta$-cholestanol of melting point 141° C.

Example 4

(a) A mixture of 2 g. of dehydrocholic acid and 2.0 g. each of sodium acetate and semicarbazide hydrochloride is refluxed with 20 cc. of alcohol for twenty-four hours. The solid mass is sucked dry on a Buchner funnel and is washed with water and ether. The crude trisemicarbazone of dehydrocholic acid thus obtained is heated with 3 g. of sodium dissolved in 30 cc. of absolute alcohol for eight hours at 180° C. Then the mixture is poured into water, acidified, and extracted with ether. The ethereal layer is washed well with water and then evaporated to dryness. The residue is crystallized repeatedly from acetic acid to give lithocholic acid of melting point 182° C.

Dehydrodesoxycholic acid may be treated in the same fashion, and likewise gives a good yield of lithocholic acid.

Example 5

(a) The semicarbazone of sarsasapogenone is prepared by refluxing a solution of 2 g. of sarsasapogenone in 350 cc. of alcohol with 2 g. semicarbazide hydrochloride and 2.5 g. of sodium acetate for two hours on the steam bath. The solution, upon dilution with water, gives a white solid which is collected and recrystallized from aqueous ethanol to give an ether-soluble semicarbazone of melting point 180° with decomposition.

(b) To a solution of 1.2 g. of sodium in 15 cc. of absolute alcohol is added 2 g. of the above sarsasapogenone semicarbazone. The mixture is heated in a sealed tube at 175–180° C. for seven hours. Then the material is washed out with ether and water. The ethereal layer is separated and washed with water and then the ether is removed on a steam bath. The residue is crystallized from ethyl acetate. In this manner there is obtained about a 10% yield of desoxysarsasapogenin. The mother liquors are concentrated and crystallized to give the main reaction product, sarsasapogenin, crystallizing as white needles of melting point 198° C. This gives no depression in melting point when mixed with an authentic sample of sarsasapogenin.

Example 6

(a) Chlorogenone is prepared as described for example by Noller, J. Am. Chem. Soc. 51, 1092, (1937). Its disemicarbazone is prepared in the usual manner by refluxing a solution of 3 g. of chlorogenone with 2 g. of semicarbazide hydrochloride and 2.5 g. of sodium acetate in 300 cc. of alcohol for four hours. The reaction mixture is evaporated to a small volume and then diluted with water. The precipitate is collected and washed with a small amount of alcohol and ether to give the disemicarbazone of chlorogenone.

(b) To a solution of 2 g. of sodium in 25 cc. of benzyl alcohol is added 2 g. of the above disemicarbazone. The reaction mixture is refluxed for eight hours, and then is cooled. The benzyl alcohol is removed from the reaction mixture by steam distillation until no more volatile products come over. The residue is dissolved in ether, the ethereal layer washed with dilute sodium hydroxide solution and with water and the ether removed on the steam bath. The residue is crystallized from methanol to give tigogenin of melting point 202–203° C.

The foregoing examples illustrative of my invention are subject to numerous variations with regard to reaction conditions, and reagents employed.

For example, instead of using the semicarbazone of a steroidal ketone I may practice my invention on the hydrazone itself, on the thiosemicarbazone, on the acetylhydrazone or on other hydrazones derived from acyl-hydrazines. Instead of using ethyl alcohol or benzyl alcohol as shown in the examples I may employ other alcohols, such as methanol, n-butyl alcohol, geraniol and the like. Instead of using sodium ethylate other strong bases, such as sodamide, potassium methylate, potassium hydroxide, barium hydroxide and the like may be employed.

According to my invention nuclear ketone groups at C-3 of the steroidal ketones are reduced to 3-hydroxyl groups. Ketone groups at other positions in the molecule are eliminated, that is to say, these ketone groups are replaced by methylene groups. Other transformations may occur during the practice of my invention. For example, ester groups are hydrolyzed with production of the corresponding hydroxyl groups.

It will be appreciated that according to my invention epimeric hydroxyl groups at C-3 may be formed. I find that one epimer is formed predominantly in each case and the stereochemical configuration of this epimer may be predicted in accordance with the following rule: When nuclear ketone groups at C-3 of compounds having the alloconfiguration (cholestane type) with regard to C-5 are reduced, the 3-($\beta$)-hydroxy compounds are formed predominantly, while if 3-keto compounds of the regular series, with regard to C-5 (coprostane type) are reduced, the 3-($\alpha$)-hydroxy compounds are formed predominantly.

Furthermore, I find that the presence of nuclear double bonds does not affect the course of the reaction when practiced as set forth in this specification.

Because of these permissible variations in my process, I do not wish to limit myself to any specific embodiment, but desire rather that the scope of my invention be interpreted as broadly as possible in view of the prior art and the appended claims.

What I claim as my invention is:

1. Process for the preparation of steroidal carbinols which comprises treating a steroidal ketone having a ketone group at least at $C_3$ with a member of the class consisting of hydrazine and its mono-acylated derivatives thereby obtaining a condensation product, and treating said condensation product with a strong base and an alcohol at high temperatures, thereby forming a 3-hydroxy-steroid.

2. In a process for the preparation of steroidal carbinols, the step in which a condensation product of a steroidal ketone having a ketone group at least at $C_3$ with a member of the class consisting of hydrazine and its mono-acylated derivatives is treated with a strong base and an alcohol at high temperatures, thereby forming a 3-hydroxy-steroid.

3. Process for the preparation of 3-hydroxy-steroids which comprises treating a steroidal polyketone in which one ketone group is at $C_3$ with a member of the class consisting of hydrazine and its mono-acylated derivatives, thereby obtaining a condensation product and treating said condensation product with a strong base and an alcohol at high temperatures, thereby obtaining a 3-hydroxy-steroid in which the other ketone groups have been replaced by methylene groups.

4. Process for the preparation of steroidal carbinols which comprises treating a steroidal ketone having a ketone group at least at $C_3$, said steroidal ketone being derived from a member of the class consisting of ketonic sapogenin compounds, ketonic bile acid compounds, and ketonic pregnane compounds, with a member of the class consisting of hydrazine and its monoacylated derivatives thereby obtaining a condensation product, and treating said condensation product at 150–250° C. with an alcohol and a member of the class consisting of alkali metal amides, alkali metal alcoholates and alkali metal hydroxides thereby forming a 3-hydroxy-steroid.

5. In a process for the preparation of steroidal carbinols, the step in which a condensation product of a member of the class consisting of hydrazine and its monoacylated derivatives with steroidal ketones having a ketone group at least at $C_3$, said steroidal ketone being derived from a member of the class consisting of ketonic sapogenin compounds, ketonic bile acid compounds, and ketonic pregnane compounds, is treated at 150–250° C. with an alcohol and a member of the class consisting of alkali metal amides, alkali metal alcoholates and alkali metal hydroxides thereby forming a 3-hydroxy-steroid.

6. Process for the preparation of 3-hydroxy-steroids which comprises treating a steroidal polyketone in which one ketone group is at $C_3$, said steroidal ketone being derived from a member of the class consisting of ketonic sapogenin compounds, ketonic bile acid compounds, and ketonic pregnane compounds, with a member of the class consisting of hydrazine and its monoacylated derivatives thereby obtaining a condensation product, and treating said condensation product at 150–250° C. with an alcohol and a member of the class consisting of alkali metal amides, alkali metal alcoholates and alkali metal hydroxides thereby obtaining a 3-hydroxy-steroid in which the other ketone groups have been replaced by methylene groups.

7. In a process for the preparation of steroidal carbinols, the step in which a semicarbazone of a steroidal ketone having a ketone group at least at $C_3$, said steroidal ketone being derived from a member of a class consisting of ketonic sapogenin compounds, and ketonic bile acid compounds, ketonic pregnane compounds, is treated at 170–200° C. with sodium ethylate and ethyl alcohol thereby forming a 3-hydroxy-steroid.

8. Process for the preparation of a 3-hydroxy bile acid which comprises treating a semicarbazone of a polyketo bile acid in which at least one ketone group is at $C_3$ at 170–200° C. with sodium ethylate and ethyl alcohol.

9. Process for the preparation of a 3-hydroxy sapogenin which comprises treating a semicarbazone of a polyketo sapogenin having a ketone group at $C_3$ at 170–200° C. with sodium ethylate and ethyl alcohol.

RUSSELL EARL MARKER.